(12) United States Patent
Takeda et al.

(10) Patent No.: US 10,944,098 B2
(45) Date of Patent: Mar. 9, 2021

(54) NEGATIVE ELECTRODE ACTIVE MATERIAL PARTICLE, NEGATIVE ELECTRODE, LITHIUM-ION SECONDARY BATTERY, AND PRODUCTION METHOD OF NEGATIVE ELECTRODE ACTIVE MATERIAL PARTICLE

(71) Applicant: TOYOTA JIDOSHA KABUSHIKI KAISHA, Toyota (JP)

(72) Inventors: Kazuhisa Takeda, Toyota (JP); Keisuke Ohara, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 286 days.

(21) Appl. No.: 15/957,068

(22) Filed: Apr. 19, 2018

(65) Prior Publication Data

US 2018/0315998 A1    Nov. 1, 2018

(30) Foreign Application Priority Data

Apr. 28, 2017   (JP) ................. 2017-090294

(51) Int. Cl.
| | |
|---|---|
| *H01M 10/0525* | (2010.01) |
| *H01M 4/133* | (2010.01) |
| *H01M 4/1393* | (2010.01) |
| *H01M 4/583* | (2010.01) |
| *H01M 4/36* | (2006.01) |
| *H01M 4/587* | (2010.01) |
| *H01M 4/02* | (2006.01) |

(52) U.S. Cl.
CPC ......... *H01M 4/133* (2013.01); *H01M 4/1393* (2013.01); *H01M 4/366* (2013.01); *H01M 4/587* (2013.01); *H01M 4/5835* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 3,929,920 A * | 12/1975 | Komo ............... | C01B 32/10 570/150 |
| 4,931,163 A * | 6/1990 | Watanabe ........... | C10C 3/02 106/284 |
| 2009/0286157 A1* | 11/2009 | Chen ............... | H01M 4/0416 429/209 |
| 2018/0205076 A1* | 7/2018 | Suzuki ............. | H01M 4/1393 |

FOREIGN PATENT DOCUMENTS

| | | |
|---|---|---|
| JP | 07-312218 A | 11/1995 |
| JP | 08-031404 A | 2/1996 |
| JP | 11-067193 A | 3/1999 |
| JP | 2002-279983 A | 9/2002 |

* cited by examiner

*Primary Examiner* — Tracy M Dove
(74) *Attorney, Agent, or Firm* — Sughrue Mion, PLLC

(57) ABSTRACT

A negative electrode active material particle includes natural graphite and a coating. The surface of the natural graphite is coated with the coating. The coating contains low crystalline carbon and fluorine. The low crystalline carbon has lower crystallinity than the natural graphite and a structure in which carbon hexagonal net planes are layered in a portion of the low crystalline carbon. The peak of CF2 bonds is detected by X-ray photoelectron spectroscopy of the negative electrode active material particle, and the fluorine concentration of the surface of the negative electrode active material particle is 10 atm % or more and 20 atm % or less.

2 Claims, 6 Drawing Sheets

NEGATIVE ELECTRODE ACTIVE MATERIAL PARTICLE, NEGATIVE ELECTRODE, LITHIUM-ION SECONDARY BATTERY, AND PRODUCTION METHOD OF NEGATIVE ELECTRODE ACTIVE MATERIAL PARTICLE

INCORPORATION BY REFERENCE

The disclosure of Japanese Patent Application No. 2017-090294 filed on Apr. 28, 2017 including the specification, drawings and abstract is incorporated herein by reference in its entirety.

BACKGROUND

1. Technical Field

The disclosure relates to a negative electrode active material particle, a negative electrode, a lithium-ion secondary battery, and a production method of a negative electrode active material particle.

2. Description of Related Art

Japanese Unexamined Patent Application Publication No. 2002-279983 (JP 2002-279983 A) discloses a negative electrode active material particle obtained by coating the surface of a first carbon material with a second carbon material. The first carbon material does not contain fluorine, and the second carbon material has lower crystallinity than the first carbon material and is regarded as containing fluorine.

SUMMARY

As the negative electrode active material particle of a lithium-ion secondary battery, a coated particle obtained by coating the surface of natural graphite with low crystalline carbon is known. According to JP 2002-279983 A, it is disclosed that the storage characteristics of the lithium-ion secondary battery are improved by causing the low crystalline carbon of the coated particle and fluorine gas to react with each other at a temperature of 50° C. to 400° C. However, it is considered that there is room for improvement in the storage characteristics of the lithium-ion secondary battery.

The disclosure provides a negative electrode active material particle which cause excellent storage characteristics for a lithium-ion secondary battery.

Hereinafter, the technical configuration and operational effects of the disclosure will be described. The operation mechanism of the disclosure includes estimation. The scope of the claims should not be limited by whether or not the operation mechanism is correct.

A first aspect of the disclosure relates to a negative electrode active material particle including natural graphite and a coating with which the surface of the natural graphite is coated. The coating contains low crystalline carbon and fluorine. The low crystalline carbon has lower crystallinity than the natural graphite and a structure in which carbon hexagonal net planes are layered in a portion of the low crystalline carbon. The peak of CF2 bonds is detected by X-ray photoelectron spectroscopy of the negative electrode active material particle, and the fluorine concentration of the surface of the negative electrode active material particle is 10 atm % or more and 20 atm % or less.

In a production method of JP 2002-279983 A, it is considered that CF2 bonds are not formed by the reaction between the low crystalline carbon and the fluorine. According to the first aspect of the disclosure, by causing the low crystalline carbon and the fluorine to react with each other to form CF2 bonds, the storage characteristics of a lithium-ion secondary battery can be further improved. The presence of CF2 bonds can be confirmed by the F1s spectrum of the X-ray photoelectron spectroscopy (XPS).

FIG. 1 is a conceptual diagram showing a low crystalline carbon layer containing fluorine. Although low crystalline carbon has lower crystallinity than natural graphite, the low crystalline carbon contains a graphitic portion (a crystal structure similar to natural graphite). That is, the low crystalline carbon includes a structure in which carbon hexagonal net planes are layered. Since the low crystalline carbon has lower crystallinity than the natural graphite, it is considered that the spacing between the carbon hexagonal net planes is wider than that of the natural graphite. The carbon hexagonal net plane is also called a basal plane. An end plane parallel to the layering direction of the basal planes is also called an edge plane.

In the production method of JP 2002-279983 A, it is considered that CF bonds are formed. The CF bonds can be formed in both the basal plane of the outermost layer and the edge plane. It is considered that a coating of lithium fluoride (LiF) is formed by a reaction between fluorine bonded to the carbon hexagonal net plane and lithium (Li) ions supplied from a positive electrode. The coating of LiF has excellent Li ion permeability and is electrochemically stable. It is considered that the coating of LiF suppresses the growth of a solid-electrolyte interphase (SEI) and thus the storage characteristics of the lithium-ion secondary battery are improved.

However, in the production method of JP 2002-279983 A, it is considered that CF2 bonds are not formed. The CF2 bond has a larger binding energy than the CF bond. Therefore, it is considered that CF2 bonds are not formed unless conditions that low crystalline carbon and fluorine easily react with each other to some extent are achieved. Since carbon has solely a single dangling bond on the basal plane, it is considered that CF2 bonds are not formed. CF2 bonds can be selectively formed on the edge plane where carbon has two dangling bonds, that is, at the end of the carbon hexagonal net plane.

By causing CF2 bonds to be present at the end of the carbon hexagonal net plane, the storage characteristics of the lithium-ion secondary battery can be further improved. Details of the mechanism described above are not clear. However, at this point in time, for example, the following reasons are conceivable. Since CF2 bonds are more stable than CF bonds (have larger binding energy), it is considered that the effect of suppressing the growth of SEI is easily retained. It is considered that as a composition product of an electrolytic solution or the like is bonded to the dangling bond at the edge plane, the growth of SEI easily proceeds. Since the dangling bond at the edge plane is terminated with two fluorine atoms, the two fluorine atoms act as steric hindrance. As described above, it is considered that the approach of the decomposition product to the dangling bond at the edge plane is suppressed.

However, the fluorine concentration of the surface of the negative electrode active material particle is set to 10 atm % or more. When the fluorine concentration is less than 10 atm %, the improvement in the storage characteristics of the lithium-ion secondary battery is small. It is considered that the improvement in the storage characteristics of the lithium-ion secondary battery is small because the amount of CF2 bonds being present is small.

In addition, the fluorine concentration of the surface of the negative electrode active material particle is set to 20 atm % or less. When the fluorine concentration exceeds 20 atm %, there is a possibility that the decrease in initial efficiency may become large. It is considered that this is because CF bonds are introduced between the carbon hexagonal net planes.

It is considered that the introduction of CF bonds between the carbon hexagonal net planes is not easier than the introduction of CF bonds to the outermost plane of the layered structure. It is considered that this is because adjacent carbon hexagonal net planes act as steric hindrance. However, as the reaction between carbon and fluorine is excessively promoted, CF bonds can be introduced between the carbon hexagonal net planes. It is considered that the introduction of the CF bonds between the carbon hexagonal net planes decreases the number of sites where Li ions can be reversibly stored decreases, and thus the initial efficiency decreases. It is also considered that as the potential of the reaction with Li ions increases, the energy density decreases.

The fluorine concentration of the surface of the negative electrode active material particle is also measured by XPS. According to XPS, it is considered that information on the outermost surface (coating) of the negative electrode active material particle is acquired. In consideration of the measurement accuracy of an XPS apparatus, in a case where there is a value after the decimal point in the fluorine concentration, the value after the decimal point is rounded off.

A second aspect of the disclosure relates to a negative electrode including the negative electrode active material particle of the first aspect. A lithium-ion secondary battery including the negative electrode is expected to have excellent storage characteristics for the lithium-ion secondary battery.

A third aspect of the disclosure relates to a lithium-ion secondary battery including the negative electrode of the second aspect. The lithium-ion secondary battery is expected to have excellent storage characteristics for the lithium-ion secondary battery.

A fourth aspect of the disclosure relates to a production method of a negative electrode active material particle. The production method includes coating a surface of natural graphite with a coating, and causing the coating to contain fluorine. The coating is formed to contain low crystalline carbon. The low crystalline carbon has lower crystallinity than the natural graphite and a structure in which carbon hexagonal net planes are layered in a portion of the low crystalline carbon. The peak of CF2 bonds is detected by X-ray photoelectron spectroscopy of the negative electrode active material particle, and the fluorine concentration of the surface of the negative electrode active material particle is set to 10 atm % or more and 20 atm % or less.

With the production method described above, a negative electrode active material particle having excellent storage characteristics for a lithium-ion secondary battery can be produced.

In the production method according to the fourth aspect of the disclosure, the causing of the coating to contain fluorine may include causing the low crystalline carbon and a plasma of carbon tetrafluoride gas to react with each other. With the method described above, CF2 bonds can be formed at the end of the carbon hexagonal net plane of the low crystalline carbon.

In the production method according to the fourth aspect of the disclosure, the causing of the coating to contain fluorine may include causing the low crystalline carbon and carbon dioxide gas to react with each other, and causing the low crystalline carbon which is reacted with the carbon dioxide gas and fluorine gas to react with each other. Even with the method described above, CF2 bonds can be formed at the end of the carbon hexagonal net plane of the low crystalline carbon.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
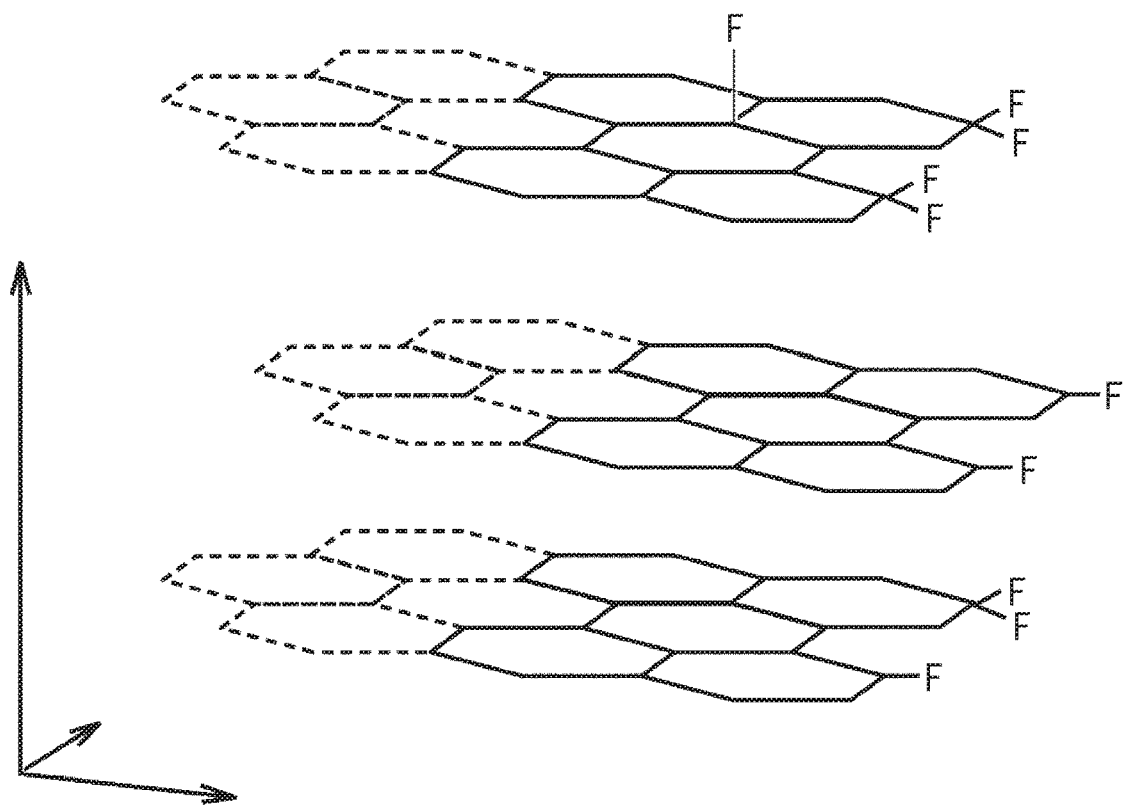
FIG. 1 is a conceptual diagram showing a low crystalline carbon layer containing fluorine.

Hereinafter, an embodiment of the disclosure (also referred to as "the embodiment" in the specification) will be described. However, the following description does not limit the scope of the claims. In the drawings of the disclosure, for the convenience of description, dimensional relationships are appropriately changed. The dimensional relationships shown in the drawings of the disclosure do not represent the actual dimensional relationships.

Negative Electrode Active Material Particle

Figure 2:
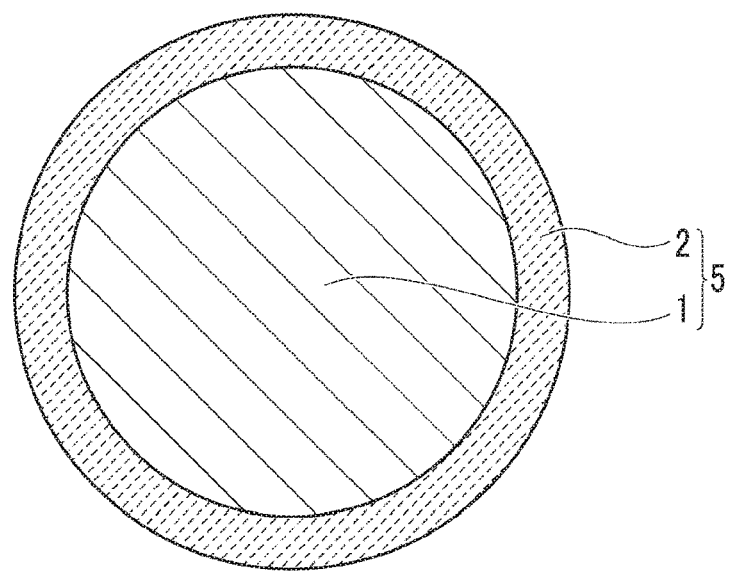
FIG. 2 is a conceptual cross-sectional view showing a negative electrode active material particle of an embodiment.

FIG. 2 is a conceptual cross-sectional view showing a negative electrode active material particle of the embodiment. Negative electrode active material particles 5 may have, for example, an average particle size of 3 μm to 30 μm or an average particle size of 10 μm to 15 μm. The average particle size in the specification indicates a cumulative 50% particle size from the fine particle side (relatively small side) in a volume-based particle size distribution measured according to a laser diffraction/scattering method.

The negative electrode active material particle 5 includes natural graphite 1 and a coating 2. The surface of the natural graphite 1 is coated with the coating 2. The entire surface of the natural graphite 1 may be coated with the coating 2, or a portion of the surface thereof may be coated with the coating 2. That is, at least a portion of the surface of the natural graphite 1 may be coated with the coating 2.

Natural Graphite

The natural graphite 1 is a nuclei material of the negative electrode active material particle 5. The natural graphite 1 may have, for example, an average particle size of 1 μm to 28 μm or an average particle size of 10 μm to 15 μm. The natural graphite 1 may be, for example, spheroidized natural graphite. Spheroidized natural graphite refers to natural graphite subjected to a spheroidization process. The spheroidization process may be a process for bringing the outer shape of natural graphite (scaly graphite) close to a spherical shape, for example, by friction in a gas flow, grinding, or the like. Since the exposure of the edge plane of the graphite crystal is suppressed by the spheroidization process, an improvement of the storage characteristics of a lithium-ion secondary battery is expected.

Coating

The surface of the natural graphite 1 is coated with the coating 2. The coating 2 includes low crystalline carbon and fluorine. The low crystalline carbon has lower crystallinity than the natural graphite 1. The low crystalline carbon has a structure in which carbon hexagonal net planes in a portion thereof.

The crystallinity of the natural graphite 1 and the low crystalline carbon can be evaluated, for example, by the average spacing of (002) planes. The average spacing between the (002) planes is also called "d002". It is considered that the wider the average spacing between the (002) planes, the lower the crystallinity. The average spacing between the (002) planes can be measured by an X-ray diffraction (XRD) method. The natural graphite 1 may have, for example, an average spacing between (002) planes of 0.3354 nm or more and 0.3356 nm or less. The low crystalline carbon may have, for example, an average spacing between (002) planes of more than 0.3356 nm and 0.3450 nm or less, or may have an average spacing between (002) planes of 0.3400 nm or less.

The crystallinity of the natural graphite 1 and the low crystalline carbon can also be evaluated, for example, by an R value. The R value can be measured by Raman spectroscopy. That is, the R value is the ratio of the Raman band (D band) at near 1360 cm$^{-1}$ to the Raman band (G band) at near 1580 cm$^{-1}$ measured by the Raman spectroscopy. It is considered that the G band is a peak derived from graphite crystals and the D band is a peak derived from amorphous carbon. The R value may be written as "$I_{1360}/I_{1580}$" in some cases. It is considered that the larger the R value, the lower the crystallinity. The natural graphite 1 may have an R value of, for example, 0.01 or more and 0.15 or less. The low crystalline carbon may have an R value of, for example, 0.20 or more and 1.00 or less, or an R value of 0.4 or more and 0.8 or less.

For example, the low crystalline carbon may have a ratio of 1 mass % or more to the negative electrode active material particle 5, a ratio of 3 mass % or more, or a ratio of 5 mass % or more. For example, the low crystalline carbon may have a ratio of 20 mass % or less to the negative electrode active material particle 5, a ratio of 15 mass % or less, or a ratio of 10 mass % or less.

X-Ray Photoelectron Spectroscopy (XPS)

The coating 2 contains fluorine. It is considered that at least a portion of the fluorine contained in the coating is bonded to the edge plane (the end of the carbon hexagonal net plane of the low crystalline carbon). It is considered that at least a portion of the fluorine bonded to the end of the carbon hexagonal net plane forms CF2 bonds. CF bonds may be present as long as the CF2 bonds are present. The CF bonds may be formed at both the edge plane and the basal plane.

The bonding state of fluorine can be confirmed by XPS. In a C1s spectrum, the peak of CF bonds appears at near 288.5 eV. In the C1s spectrum, the peak of CF2 bonds appears at near 290.5 eV. In an F1s spectrum, the peak of CF2 bonds appears at near 691 eV. In the embodiment, in a case where the peak of CF2 bonds is detected in the F1s spectrum, CF2 bonds are regarded as being present. For example, "near 288.5 eV" indicates a range of 288.5 eV±0.3 eV.

The fluorine concentration of the surface of the negative electrode active material particle is also measured by XPS. The "surface of the negative electrode active material particle" in the specification indicates a range from the surface of the negative electrode active material particle 5 to a position 100 nm apart toward the center of the negative electrode active material particle 5. In the embodiment, the fluorine concentration of the surface of the negative electrode active material particle 5 is 10 atm % or more and 20 atm % or less. For a single powder sample, the fluorine concentration can be measured at least three times. The arithmetic mean of at least three measurements is employed. Since the fluorine concentration on the surface of the negative electrode active material particle 5 is 10 atm % or more, an improvement in the storage characteristics of the lithium-ion secondary battery is expected. The fluorine concentration of the surface of the negative electrode active material particle 5 may be 11 atm % or more, 16 atm % or more, or 17 atm % or more. When the fluorine concentration of the surface of the negative electrode active material particle exceeds 20 atm %, the initial efficiency may decrease. The fluorine concentration of the surface of the negative electrode active material particle 5 may be 19 atm % or less.

Production Method of Negative Electrode Active Material Particle

Figure 3:
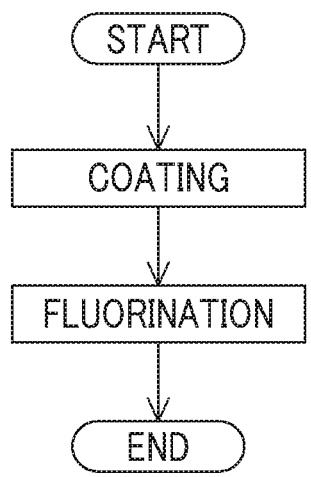
FIG. 3 is a flowchart schematically showing a production method of a negative electrode active material particle of the embodiment.

FIG. 3 is a flowchart schematically showing a production method of a negative electrode active material particle of the embodiment. The production method of the embodiment includes "coating" and "fluorination".

Coating

The production method of the embodiment includes coating the surface of the natural graphite 1 with the coating 2. The coating 2 is formed to contain low crystalline carbon. As described above, the low crystalline carbon has lower crystallinity than the natural graphite 1 and a structure in which carbon hexagonal net planes are layered in a portion thereof.

A method of forming the coating 2 is not particularly limited. For example, a method of generating low crystalline carbon by coating the surface of the natural graphite 1 with a precursor of the low crystalline carbon and thereafter heating the precursor is considered.

First, the natural graphite 1 is prepared. Details of the natural graphite 1 are as described above. The precursor of the low crystalline carbon is prepared. Examples of the precursor of the low crystalline carbon include pitch (coal tar pitch, petroleum pitch, wood tar pitch, or the like), a polyacrylonitrile (PAN) resin, and a phenol resin. One kind of precursor may be used singly, or two or more kinds of precursor may be used in combination.

For example, a mixture is prepared by mixing the natural graphite 1 and pitch. The mixture is heated. As described above, the low crystalline carbon can be generated. The heating can be performed in a non-oxidizing atmosphere such as an argon gas atmosphere or a nitrogen gas atmosphere. The heating temperature may be, for example, 500° C. to 2000° C., 800° C. to 1500° C., or 1000° C. to 1200° C. The heating time may be, for example, 0.5 hours to 48 hours, 2 hours to 24 hours, or 6 hours to 18 hours. Hereinafter, the natural graphite 1 coated with the coating before fluorination (low crystalline carbon) is sometimes referred to as "coated particle" for convenience.

Fluorination

The production method of the embodiment includes producing the negative electrode active material particle 5 by causing fluorine to be included in the coating 2. In the embodiment, the peak of CF2 bonds is detected by XPS and the fluorine concentration of the surface of the negative electrode active material particle 5 is set to 10 atm % or more and 20 atm % or less.

A method of causing the coating 2 to contain fluorine is not particularly limited. However, a method in which CF2 bonds are formed and CF bonds are less likely to be introduced between carbon hexagonal net planes is desirable. For example, the following first method and second method are considered.

In the first method, low crystalline carbon a plasma of carbon tetrafluoride ($CF_4$) gas are caused to react with each other. That is, the fluorination (causing the coating 2 to contain fluorine) of the embodiment may include causing the low crystalline carbon and the plasma of $CF_4$ gas to react with each other. The first method has an advantage that the reaction amount can be easily adjusted.

In the first method, a powder plasma apparatus can be used. The coated particle is placed in a chamber of the powder plasma apparatus. The plasma gas is $CF_4$ gas. The pressure in the chamber can be set to, for example, about 1 Pa to 1000 Pa (typically about 100 Pa). The output can be set to, for example, about 100 W to 500 W (typically about 300 W). As described above, CF2 bonds can be formed in the low crystalline carbon.

The reaction amount can be adjusted, for example, by the processing time. The processing time may be set to, for example, 30 minutes or longer, or 50 minutes or longer. The processing time may be set to 90 minutes or shorter, or 70 minutes or shorter.

In the second method, activated low crystalline carbon and fluorine ($F_2$) gas are caused to react with each other. For example, the low crystalline carbon can be activated by a reaction between the low crystalline carbon and carbon dioxide ($CO_2$) gas at a high temperature. That is, the fluorination of the embodiment may include (i) causing the low crystalline carbon and carbon dioxide gas to react with each other, and (ii) causing the low crystalline carbon which is reacted with the carbon dioxide gas and fluorine gas to react with each other. The second method has an advantage of being suitable for mass production.

For example, first, the coated particle is exposed to a flow of heated carbon dioxide gas for about 1 minute to 20 minutes (typically about 10 minutes). As described above, the low crystalline carbon can be activated. The temperature of the carbon dioxide gas may be, for example, 900° C. or higher and 1100° C. or lower.

The coated particle is heated in a flow of fluorine gas. As described above, CF2 bonds can be formed in the low crystalline carbon. The heating temperature may be, for example, 100° C. or higher and 250° C. or lower. However, when the heating temperature becomes excessively high (for example, about 500° C.), care has to be taken because the inside of the coated particle (the natural graphite 1) is fluorinated and a reduction in the initial efficiency and an increase in the reaction potential become significant.

Lithium-Ion Secondary Battery

Hereinafter, a lithium-ion secondary battery of the embodiment will be described. Hereinafter, the lithium-ion secondary battery is abbreviated as "battery" in some cases.

Figure 4:
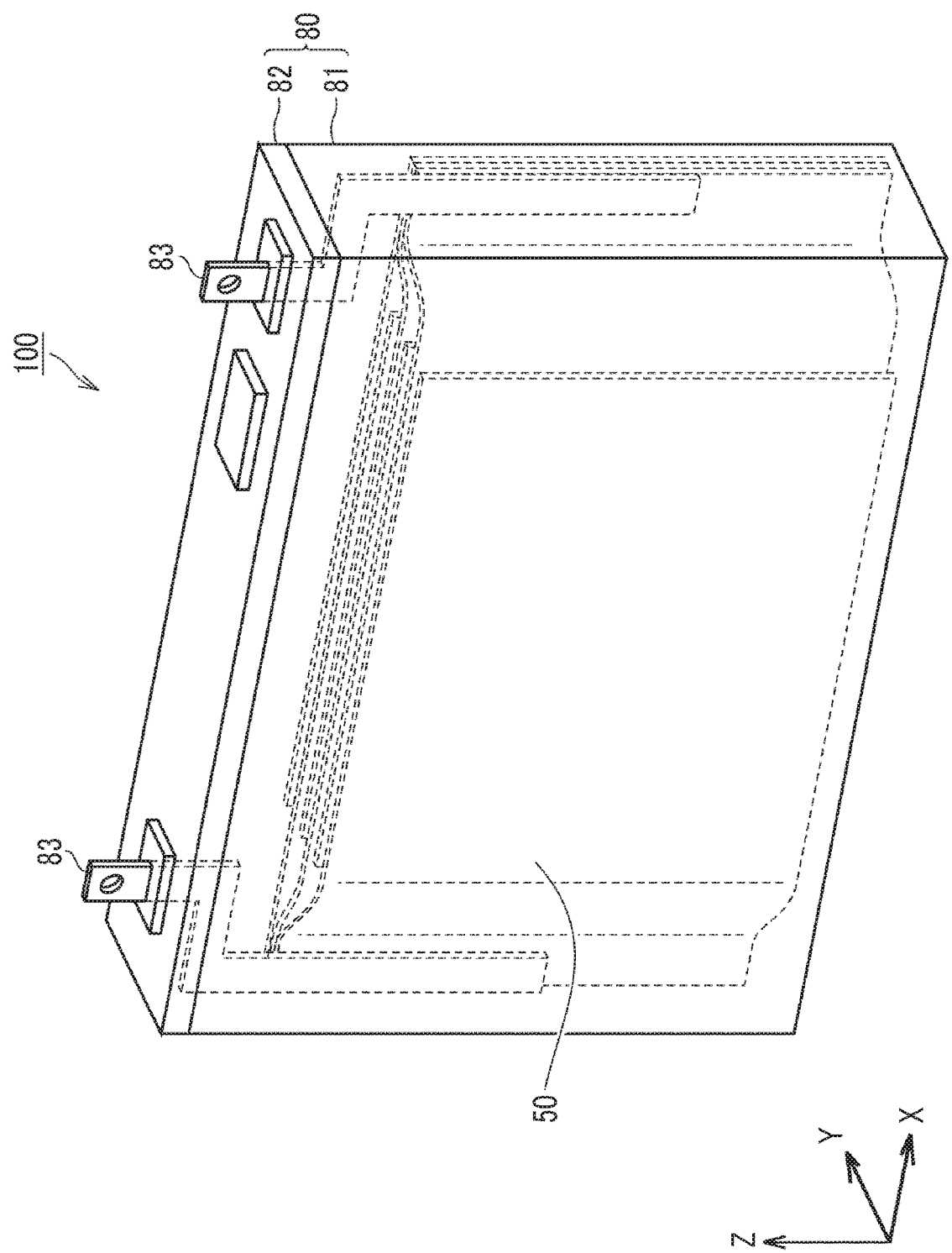
FIG. 4 is a schematic view showing an example of a configuration of a lithium-ion secondary battery of the embodiment.

FIG. 4 is a schematic view showing an example of a configuration of the lithium-ion secondary battery of the embodiment. A battery 100 includes an exterior material 80. The exterior material 80 has a rectangular shape (flat rectangular parallelepiped). However, the exterior material of the embodiment should not be limited to the rectangular shape. The exterior material may be, for example, cylindrical. The exterior material 80 may be made of, for example, iron (Fe), stainless steel (SUS), an aluminum (Al) alloy, or a resin material. The exterior material may be, for example, a bag made of an aluminum laminate film.

The exterior material 80 may be constituted of, for example, a container 81 and a lid 82. The lid 82 is joined to the container 81. The lid 82 is provided with a terminal 83. The lid 82 may be provided with an injection hole, a current interrupting mechanism (CID), a gas discharge valve, and the like.

Figure 5:
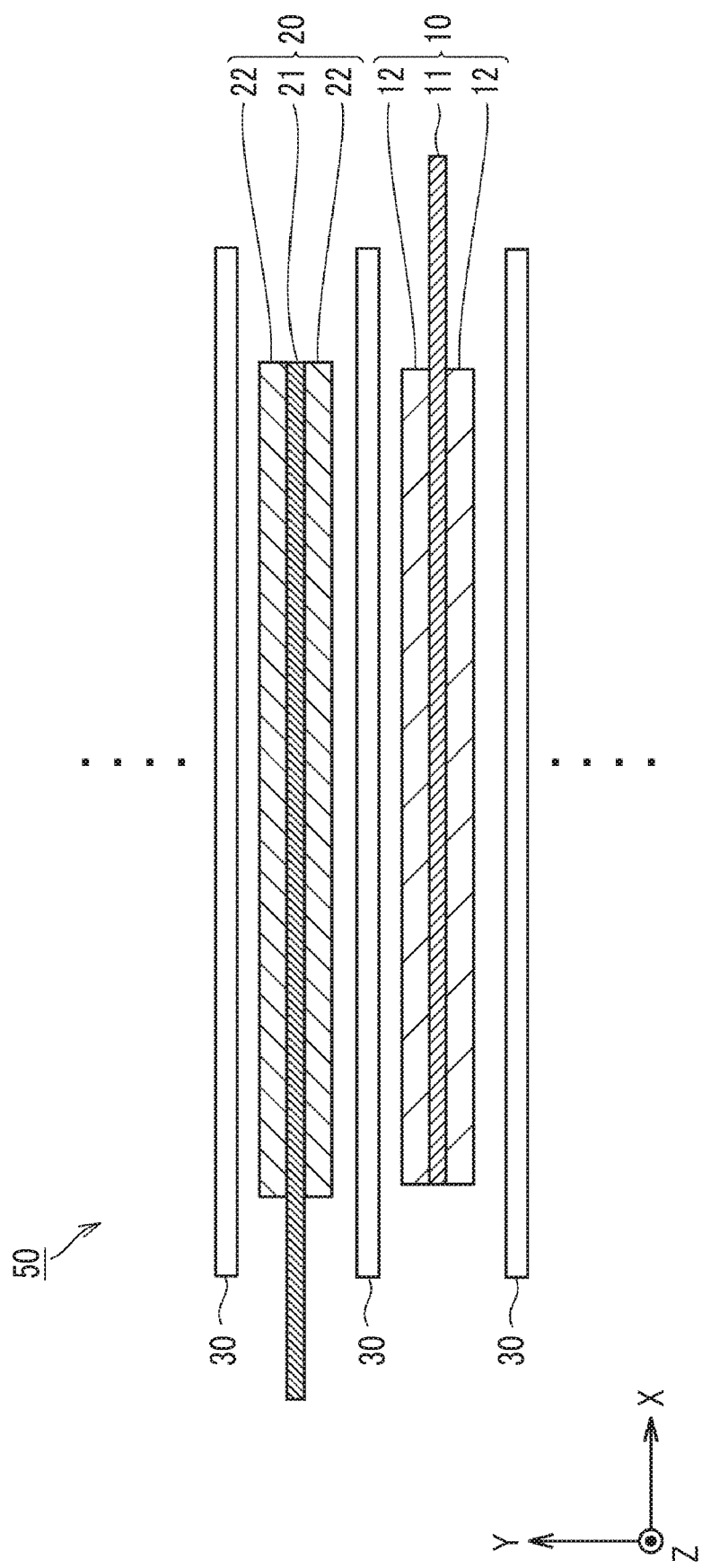
FIG. 5 is a conceptual cross-sectional view showing an example of a configuration of an electrode group.

An electrode group 50 and an electrolytic solution (not illustrated) are stored in the exterior material 80. The electrode group 50 is electrically connected to the terminal 83. FIG. 5 is a conceptual cross-sectional view showing an example of a configuration of the electrode group. The electrode group 50 includes a positive electrode 10, a separator 30, and a negative electrode 20. The separator 30 is disposed between the positive electrode 10 and the negative electrode 20. The electrode group 50 may be configured by laminating a plurality of the positive electrodes 10, the separators 30, and the negative electrodes 20 in the order of the separator 30, the positive electrode 10, the separator 30, the negative electrode 20, and the separator 30. The electrode group 50 may also be configured by laminating the positive electrode 10, the separator 30, the negative electrode 20, and the separator 30 in this order and winding the resultant into a spiral shape.

Negative Electrode

The negative electrode 20 may be a sheet having a rectangular shape, a band shape, or the like. The negative electrode 20 includes a negative electrode current collector 21 and negative electrode mixture layers 22. The negative electrode current collector 21 may have a thickness of, for example, 5 μm to 30 μm. The negative electrode current collector 21 may be, for example, a copper (Cu) foil. The copper foil may be a rolled copper foil or an electrolytic copper foil. The copper foil may be a pure copper foil or a copper alloy foil. The negative electrode 20 may have a portion where the negative electrode current collector 21 is exposed from the negative electrode mixture layers 22, as a position for connection to the terminal 83.

The negative electrode mixture layers 22 are disposed on the surfaces (both the front and rear surfaces) of the negative electrode current collector 21. The negative electrode mixture layer 22 may have a thickness of, for example, 10 μm to 200 μm. The negative electrode mixture layer 22 contains the negative electrode active material particle 5 of the embodiment described above. That is, the negative electrode 20 includes the negative electrode active material particle 5 of the embodiment described above. The battery 100 includes the negative electrode 20. Therefore, the battery 100 is expected to have excellent storage characteristics for the lithium-ion secondary battery.

For example, the negative electrode mixture layer 22 may contain 90 mass % to 99.9 mass % of the negative electrode active material particle and a binder as the remainder. The negative electrode mixture layer 22 may further contain other negative electrode active material particles as long as the negative electrode mixture layer 22 contains the negative electrode active material particle 5 of the embodiment. Examples of other negative electrode active material particle include silicon, silicon oxide, tin, and tin oxide.

The binder is not particularly limited. For example, the binder may be carboxymethyl cellulose (CMC), styrene butadiene rubber (SBR), or polyacrylic acid (PAA). One kind of binder may be used singly, or two or more kinds of binder may be used in combination.

Positive Electrode

The positive electrode 10 may be a sheet having a rectangular shape, a band shape, or the like. The positive electrode 10 includes a positive electrode current collector 11 and positive electrode mixture layers 12. The positive electrode current collector 11 may have a thickness of, for example, 10 μm to 30 μm. The positive electrode current collector 11 may be, for example, an Al foil. The Al foil may be a pure Al foil or an Al alloy foil. The positive electrode 10 may have a portion where the positive electrode current collector 11 is exposed from the positive electrode mixture layers 12, as a position for connection to the terminal 83.

The positive electrode mixture layers 12 are disposed on the surfaces (both the front and rear surfaces) of the positive electrode current collector 11. The positive electrode mixture layer 12 may have a thickness of, for example, 10 μm to 200 μm. The positive electrode mixture layer 12 contains a positive electrode active material particle. For example, the positive electrode mixture layer 12 may contain 80 mass % to 98 mass % of the positive electrode active material particle, 1 mass % to 15 mass % of a conductive material, and a binder as the remainder.

The positive electrode active material particle is not particularly limited. For example, the positive electrode active material particle may be $LiCoO_2$, $LiNiO_2$, $LiMnO_2$, $LiNi_{1/13}Co_{1/13}Mn_{1/13}O_2$, $LiNi_{0.82}Co_{0.015}Al_{0.03}O_2$, or $LiFePO_4$. One kind of positive electrode active material particle may be used singly, or two or more kinds of positive electrode active material particle may be used in combination. The positive electrode active material particle may have, for example, an average particle size of 1 μm to 30 μm.

The conductive material is not particularly limited. For example, the conductive material may be acetylene black, thermal black, furnace black, vapor grown carbon fiber, scaly graphite, or flaky graphite. One kind of conductive material may be used singly, or two or more kinds of conductive material may be used in combination. The binder is also not particularly limited. For example, the binder may be polyvinylidene fluoride (PVdF), polytetrafluoroethylene (PTFE), PAA, or CMC. One kind of binder may be used singly, or two or more kinds of binder may be used in combination.

Separator

The separator 30 may be a sheet having a rectangular shape, a band shape, or the like. The separator 30 is a porous film having electrically insulating properties. The separator 30 may have a thickness of, for example, 10 μm to 30 μm. The separator 30 is made of, for example, polyethylene (PE) or polypropylene (PP).

The separator 30 may also have a laminated structure. For example, the separator 30 may be configured by laminating a porous film made of PP, a porous film made of PE, and a porous film made of PP in this order. The separator 30 may include a heat-resistant layer on its surface. For example, the heat-resistant layer may contain an oxide material such as alumina, or a resin material such as polyimide.

Electrolytic Solution

The electrolytic solution contains a solvent and a Li salt. The Li salt is dissolved in the solvent. The lithium salt functions as a support electrolyte. The electrolytic solution may contain, for example, 0.5 mol/l to 2.0 mol/l of the Li salt. For example, the Li salt may be $LiPF_6$, $LiBF_4$, $Li[N(FSO_2)_2]$, or $Li[N(CF_3SO_2)_2]$. One kind of Li salt may be used singly, or two or more kinds of Li salt may be used in combination.

The solvent may be, for example, a mixed solvent of a cyclic carbonate and a cyclic carbonate. The mixing ratio may be, for example, "cyclic carbonate:chain carbonate=1:9 to 5:5" in terms of volume ratio. Examples of the cyclic carbonate include ethylene carbonate (EC), propylene carbonate (PC), butylene carbonate (BC), and fluoroethylene carbonate (FEC). Examples of the chain carbonate include dimethyl carbonate (DMC), ethyl methyl carbonate (EMC), and diethyl carbonate (DEC). One kind of cyclic carbonate or chain carbonate may be used singly, or two or more kinds thereof may be used in combination.

The solvent may contain, for example, lactone, a cyclic ether, a chain ether, and a carboxylic acid ester. Examples of the lactone include γ-butyrolactone (GBL) and δ-valerolactone. Examples of the cyclic ether include tetrahydrofuran (THF), 1,3-dioxolane, and 1,4-dioxane. Examples of the chain ether include 1,2-dimethoxyethane (DME). Examples of the carboxylic acid ester include methyl formate (MF), methyl acetate (MA), and methyl propionate (MP).

The electrolytic solution may further contain various functional additives in addition to the Li salt and the solvent. For example, the electrolytic solution may contain 1 mass % to 5 mass % of functional additives. Examples of the functional additives include a gas generating agent (overcharge additive) and a film forming agent. Examples of the gas generating agent include cyclohexylbenzene (CHB) and biphenyl (BP). Examples of the film forming agent include vinylene carbonate (VC), vinyl ethylene carbonate (VEC), $Li[B(C_2O_4)_2]$, $LiPO_2F_2$, propane sultone (PS), and ethylene sulfite (ES).

Hereinafter, examples will be described. However, the following examples do not limit the scope of the claims.

Production of Negative Electrode Active Material Particle

Comparative Example 1

Spheroidized natural graphite (average particle size=12 μm) was prepared. The spheroidized natural graphite was regarded as a negative electrode active material particle of Comparative Example 1.

Comparative Example 2

The spheroidized natural graphite prepared in Comparative Example 1 and pitch were mixed with each other. A mixture was prepared as described above. The mixture was heated at 1100° C. in a nitrogen gas atmosphere for 12 hours. A coated particle was prepared as described above. That is, the surface of the natural graphite was coated with a coating. The coating was formed to contain low crystalline carbon. It is considered that low crystalline carbon has lower crystallinity than natural graphite and a structure in which carbon hexagonal net planes are layered in a portion thereof. The coated particle was regarded as a negative electrode active material particle of Comparative Example 2. The mass of the coated particle was increased by 7 mass % with respect to the spheroidized natural graphite. Therefore, the coating is considered to have a ratio of 7 mass % to the coated particle.

Example 1

A powder plasma apparatus (rotary small vacuum plasma apparatus "YHS-DϕS") manufactured by Sakigake-semiconductor Co., Ltd. was prepared. The coated particle prepared in Comparative Example 2 was placed in a chamber of the powder plasma apparatus. $CF_4$ gas was caused to flow into the chamber. The pressure in the chamber was adjusted to 100 Pa. A plasma of the $CF_4$ gas was generated by an out of 300 W. As described above, the low crystalline carbon (coating) reacted with the plasma of the $CF_4$ gas. The processing time was set to 90 minutes. In this manner, a negative electrode active material particle of Example 1 was produced.

Examples 2 to 4 and Comparative Example 3

As shown in Table 1 below, a negative electrode active material particle was produced by the same production method as that in Example 1 except that the processing time was changed.

Comparative Example 4

In a flow of fluorine gas, the coated particle prepared in Comparative Example 2 was heated at 400° C. for 10 minutes. As described above, a negative electrode active material particle of Comparative Example 4 was produced.

Comparative Examples 5 and 6

As shown in Table 1 below, a negative electrode active material particle were produced by the same production method as that in Comparative Example 4 except that the processing time was changed.

Example 5

The coated particle prepared in Comparative Example 2 was exposed to a flow of carbon dioxide gas heated to 1000° C. for 10 minutes. As described above, the low crystalline carbon and the carbon dioxide gas are reacted with each other. In a flow of fluorine gas, the coated particle was heated at 250° C. for 10 minutes. As described above, the low crystalline carbon which was reacted with the carbon dioxide gas is reacted with the fluorine gas. In this manner, a negative electrode active material particle of Example 5 was produced.

Example 6

As shown in Table 1 below, a negative electrode active material particle was produced by the same production method as that in Example 5 except that the heating temperature was changed.

Evaluation

1. XPS

The fluorine concentration of the surface of the negative electrode active material particle was measured by XPS. In the negative electrode active material particle of Example 1, 78.5 atm % of carbon, 20.3 atm % of fluorine, 1.1 atm % of oxygen, and 0.1 atm % of nitrogen were detected. As described above, values after the decimal point are rounded off and thus the fluorine concentration of the surface of the negative electrode active material particle is regarded as 20 atm %.

Figure 6:
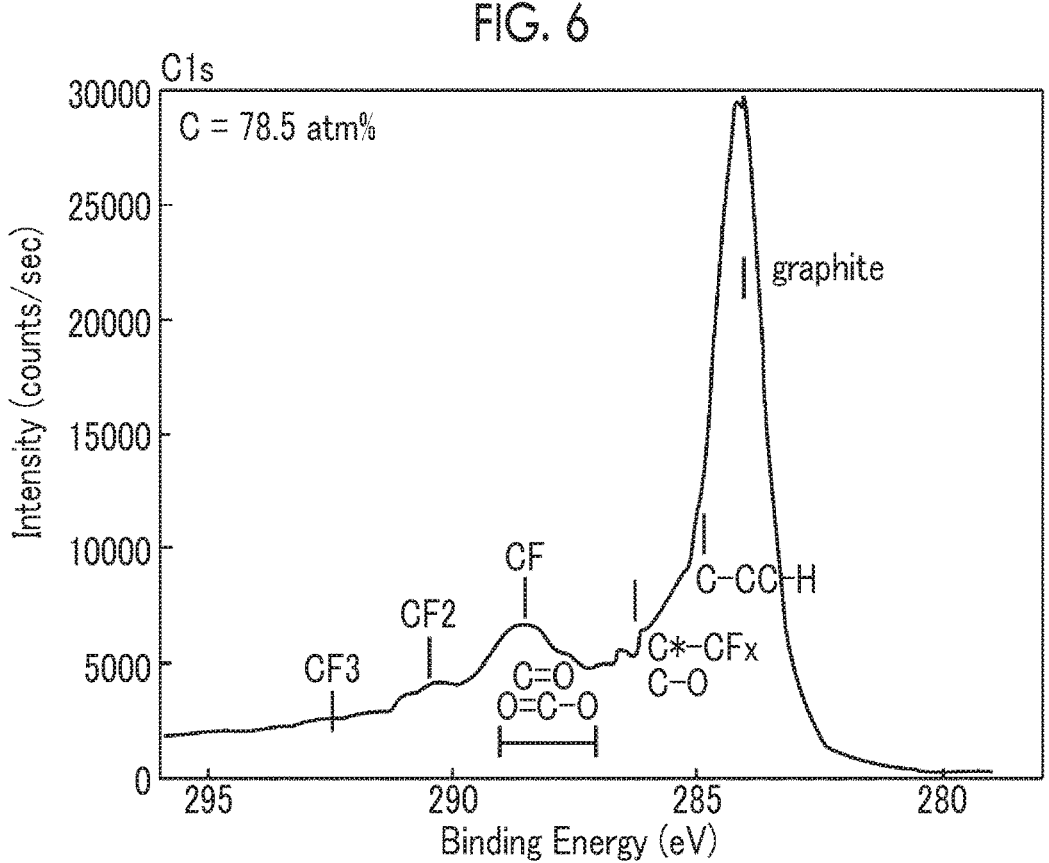
FIG. 6 is a graph showing a C1s spectrum of Example 1.
Figure 7:
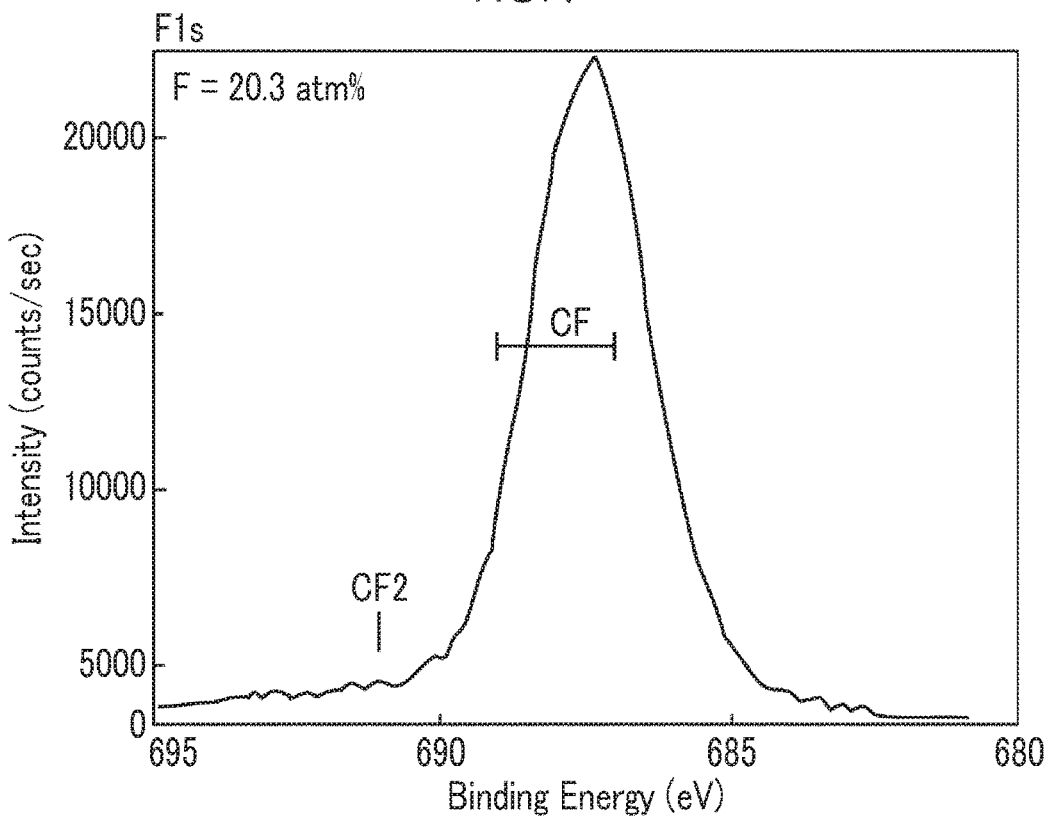
FIG. 7 is a graph showing an F1s spectrum of Example 1.

FIG. 6 shows a C1s spectrum of Example 1. In Example 1, the peak of CF bonds was detected at near 288.5 eV of the C1s spectrum and the peak of $CF_2$ bonds was detected at near 290.5 eV. FIG. 7 shows an F1s spectrum of Example 1. In Example 1, the peak of $CF_2$ bonds was detected at near 691 eV of the F1s spectrum.

The presence or absence of detection of CF bonds and $CF_2$ bonds and the fluorine concentration in each sample are shown in Table 1 below. Since Comparative Examples 1 and 2 were not fluorinated, XPS was not performed. In Examples 1 to 6, both the CF bonds and $CF_2$ bonds were detected. In Comparative Example 3, weak $CF_2$ bonds were detected. However, in Comparative Example 3, the fluorine concentration of the surface of the negative electrode active material particle was less than 10 atm %. In Comparative Examples 4 to 6, although CF bonds were detected, $CF_2$ bonds were not detected.

2. Half Cell Evaluation (Initial Efficiency)

The following materials were prepared.
Binder: CMC (product name "BSH6", manufactured by DKS Co., Ltd.)
Binder: SBR (product name "TRD102A", manufactured by JSR Corporation)
Solvent: water (deionized water)
Negative electrode current collector: rolled copper foil (thickness=10 μm)

A paint was prepared by mixing the negative electrode active material particle, the binder, and the solvent. The solid content composition of the paint was regarded as "negative electrode active material particle:CMC:SBR=98:1:1" in terms of mass ratio. The solid content ratio of the paint was 55 mass %. The solid content ratio indicates the mass ratio of components other than the solvent.

The paint was applied to the surface of the negative electrode current collector and dried. As described above, a negative electrode mixture layer was formed. The negative electrode mixture layer was formed to have a coating amount (mass per unit area) of 5 mg/cm². In this manner, a negative electrode was produced.

The negative electrode was cut into predetermined planar dimensions. In the negative electrode after being cut, the negative electrode mixture layer has planar dimensions of 33 mm×33 mm. A tab lead was connected to the negative electrode current collector. A working electrode (WE) was produced as described above.

A Li foil having planar dimensions of 35 mm×35 mm was prepared. The Li foil had a thickness of 200 μm. The Li foil was pressure-bonded to the rolled copper foil. A tab lead was connected to the rolled copper foil. A counter electrode (CE) was produced as described above.

A porous film made of PE was prepared as a separator. The separator had a thickness of 20 μm. The working electrode, the separator, and the counter electrode were laminated so that the working electrode and the counter electrode were opposite sides of the separator. An electrode group was produced as described above. As an exterior material, a bag made of an aluminum laminate film was prepared. The electrode group was accommodated in the exterior material. An electrolytic solution having the following composition was prepared.

Solvent: [EC:DMC:DEC=1:1:1 (volume ratio)]
Li salt: LiPF$_6$ (1 mol/l)

1 ml of the electrolytic solution was injected into the exterior material. The exterior material was sealed. A half cell was produced in this manner.

The half cell was left for 12 hours. After being left, the working electrode was discharged to 0 V by 2 mA constant current discharging. The discharge capacity was measured as described above. During the discharging in the half cell, an adsorption reaction of Li ions to the negative electrode active material particle was caused to proceed. After a pause of 30 minutes, the working electrode was charged to 1.5 V by 2 mA constant current charging. The charge capacity was measured as described above. During the charging in the half cell, a desorption reaction of Li ions from the negative electrode active material particle was caused to proceed. The initial efficiency was calculated by dividing the charge capacity by the discharge capacity. The results are shown in Table 1 below.

Figure 8:
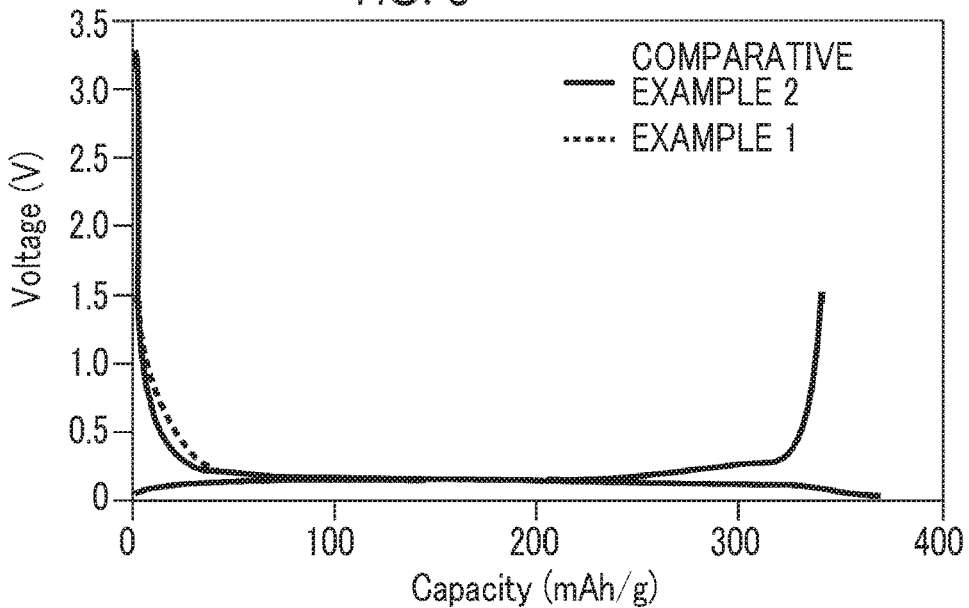
FIG. 8 is a graph showing initial charge and discharge curves of Example 1 and Comparative Example 2.

FIG. 8 shows initial charge and discharge curves of Example 1 and

Comparative Example 2. In Example 1, the initial efficiency was decreased by about 2% compared to Comparative Example 2. As shown in Table 1 below, in Examples 1 to 4 and Comparative Example 3, it can be seen that there is a tendency toward an increase in the initial efficiency as the fluorine concentration decreases.

3. Battery Evaluation (Storage Characteristics of Lithium-Ion Secondary Battery)

The following materials were prepared.

Positive electrode active material particle: LiNi$_{1/13}$Co$_{1/3}$Mn$_{1/13}$O$_2$ (average particle size=5 μm)

Conductive material: acetylene black (product name "DENKA BLACK HS-100", manufactured by Denka Company Limited)

Binder: PVdF (grade "#1300", manufactured by Kureha Corporation)

Solvent: N-methyl-2-pyrrolidone (NMP)

Positive electrode current collector: Al foil (thickness=15 μm)

A paint was prepared by mixing the positive electrode active material particle, the conductive material, the binder, and the solvent. The solid content composition of the paint was regarded as "positive electrode active material particle: conductive material:binder=85:12:3" in terms of mass ratio. The paint was applied to the surface of the positive electrode current collector and dried. As described above, a positive electrode mixture layer was formed. The positive electrode mixture layer was formed to have a coating amount (mass per unit area) of 11 mg/cm². In this manner, a positive electrode was produced.

The positive electrode was cut into predetermined planar dimensions. In the positive electrode after being cut, the positive electrode mixture layer has planar dimensions of 32 mm×32 mm. A tab lead was connected to the positive electrode current collector.

The working electrode (negative electrode) described above and the separator described above were prepared. The positive electrode, the separator, and the negative electrode were laminated so that the positive electrode and the negative electrode are opposite sides of the separator. An electrode group was produced as described above. The electrode group was accommodated in the exterior material described above. The electrolytic solution (1 ml) described above was injected into the exterior material. The exterior material was sealed. A lithium-ion secondary battery (full cell) was produced in this manner.

The battery was left for 12 hours. After being left, the battery was charged to 4.1 V by 2 mA constant current charging. After a pause of 30 minutes, the battery was discharged to 3 V by 2 mA constant current discharging. The charge capacity of each sample was about 15 mAh. However, the discharge capacities of the samples had varied. It is considered that this is because the irreversible capacity of the negative electrode active material particle varies. The discharge capacity of each sample was approximately 13 mAh to 14 mAh. The discharge capacity in this case was regarded as the initial capacity.

After the initial capacity was measured, the battery was charged by constant current-constant voltage charging (current during constant current charging=10 mA, voltage during constant voltage charging=4 V, total charging time=2 hours). The battery after being charged was stored for 60 days in a thermostat set to 60° C. After storage for 60 days, the discharge capacity (capacity after storage) was measured under the same conditions as those for the initial capacity. The capacity retention ratio was calculated by dividing the capacity after storage by the initial capacity. The results are shown in Table 1 below. It can be seen that the higher the capacity retention ratio, the better the storage characteristics of the lithium-ion secondary battery.

TABLE 1

List of examples and comparative examples

| | Negative electrode active material particle | | | XPS | | | Negative electrode | Battery Storage characteristics |
| --- | --- | --- | --- | --- | --- | --- | --- | --- |
| | Nuclei material | Coating (low crystalline carbon) mass % | Fluorination | C1s spectrum CF bond peak | F1s spectrum CF2 bond peak | Surface fluorine concentration atm % | Half cell Initial efficiency % | Capacity retention ratio % |
| Comparative Example 1 | Spheroidized natural graphite | 0 | No | — | — | 0 | 86 | 72 |
| Comparative Example 2 | Spheroidized natural graphite | 7 | No | — | — | 0 | 94 | 80.9 |
| Example 1 | Spheroidized natural graphite | 7 | $CF_4$ plasma 90 minutes | Detected | Detected | 20 | 92 | 93.5 |
| Example 2 | Spheroidized natural graphite | 7 | $CF_4$ plasma 70 minutes | Detected | Detected | 19 | 92 | 93.4 |
| Example 3 | Spheroidized natural graphite | 7 | $CF_4$ plasma 50 minutes | Detected | Detected | 17 | 93 | 93.1 |
| Example 4 | Spheroidized natural graphite | 7 | $CF_4$ plasma 30 minutes | Detected | Detected | 10 | 93 | 92 |
| Comparative Example 3 | Spheroidized natural graphite | 7 | $CF_4$ plasma 10 minutes | Detected | Detected (weak) | 3 | 94 | 84 |
| Comparative Example 4 | Spheroidized natural graphite | 7 | $F_2$ gas 400° C. 10 minutes | Detected | Not detected | 20 | 82 | 86 |
| Comparative Example 5 | Spheroidized natural graphite | 7 | $F_2$ gas 250° C. 10 minutes | Detected | Not detected | 10 | 86 | 86.5 |
| Comparative Example 6 | Spheroidized natural graphite | 7 | $F_2$ gas 100° C. 10 minutes | Detected | Not detected | 5 | 92 | 87 |
| Example 5 | Spheroidized natural graphite | 7 | $CO_2$ gas 1000° C. 10 minutes → $F_2$ gas 250° C. 10 minutes | Detected | Detected | 16 | 85 | 92.6 |
| Example 6 | Spheroidized natural graphite | 7 | $CO_2$ gas 1000° C. 10 minutes → $F_2$ gas 100° C. 10 minutes | Detected | Detected | 11 | 92 | 91.2 |

Results

From the results of Comparative Examples 1 and 2, it can be seen that there is a tendency for the initial efficiency and the capacity retention ratio to be improved by coating the natural graphite with the low crystalline carbon.

From the results of Comparative Examples 2 and 6, it can be seen that there is a tendency for the capacity retention ratio to be improved by the fluorination of the coating.

From the results of Comparative Examples 4 to 6, it can be seen that there is a tendency for the initial efficiency to decrease with an increase in the fluorine concentration in the sample from which no CF2 bonds were detected. At this time, the capacity retention ratio hardly changed.

From the results of Examples 1 to 4 and Comparative Example 3, it can be seen that there is a tendency for the capacity retention ratio to be improved with an increase in the fluorine concentration in the sample from which CF2 bonds were detected.

From the results of Examples 1 to 6, it can be seen that there is a tendency for the capacity retention ratio to be improved by fluorinating the low crystalline carbon to form CF2 bonds, regardless of the production method of a negative electrode active material particle.

Figure 9:
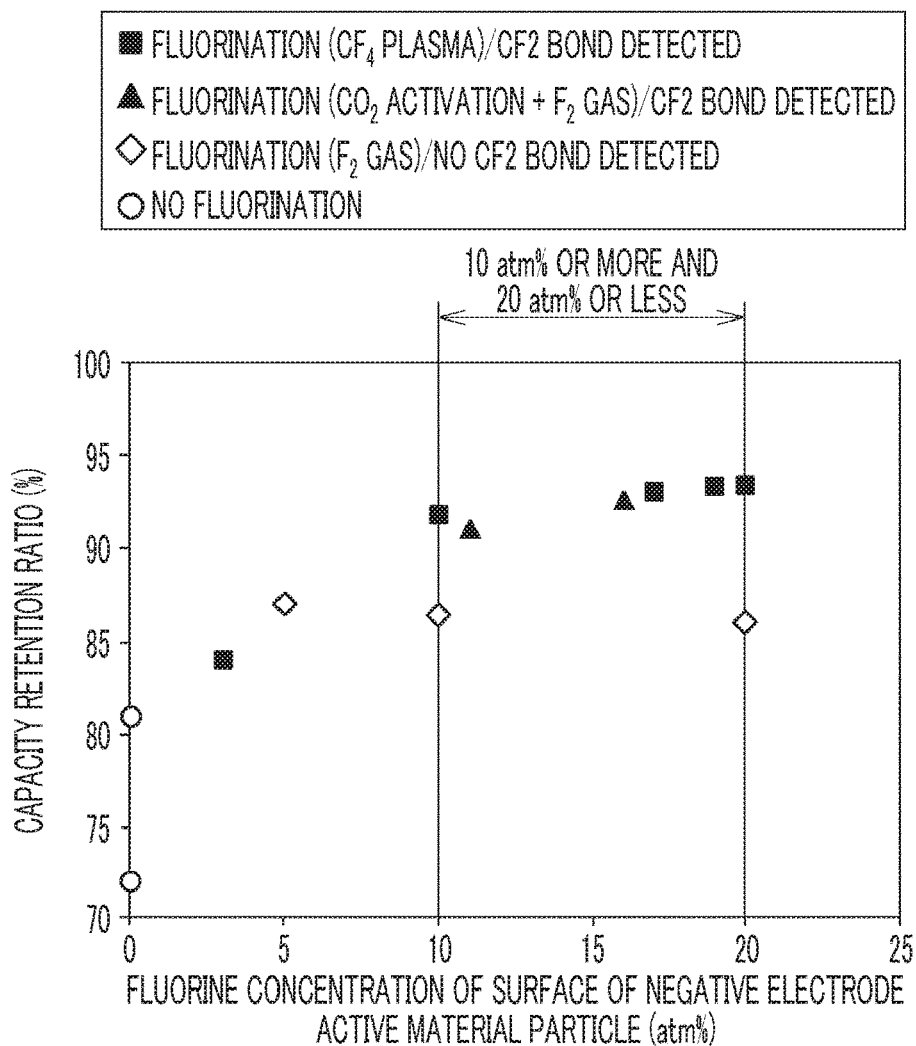
FIG. 9 is a graph showing the relationship between a fluorine concentration of the surface of the negative electrode active material particle and a capacity retention ratio.

FIG. 9 is a graph showing the relationship between the fluorine concentration of the surface of the negative electrode active material particle and the capacity retention ratio. The sample from which CF2 bonds were detected and the sample from which no CF2 bonds were detected are obviously different in the transition of the capacity retention ratio with respect to the fluorine concentration.

The embodiments and the examples are illustrative examples in all respects and are not restrictive. The technical scope defined by the description of the claims includes all changes within the meaning and scope equivalent to the claims.

What is claimed is:

1. A production method of a negative electrode active material particle, the production method comprising:
    coating a surface of natural graphite with a coating; and
    causing the coating to contain fluorine including causing the low crystalline carbon and carbon dioxide gas to react with each other, and causing the low crystalline carbon which is reacted with the carbon dioxide gas and a fluorine gas to react with each other, wherein:
    the coating is formed to contain low crystalline carbon;
    the low crystalline carbon has lower crystallinity than the natural graphite and a structure in which carbon hexagonal net planes are layered in a portion of the low crystalline carbon; and
    a peak of CF2 bonds is detected by X-ray photoelectron spectroscopy of the negative electrode active material particle, and a fluorine concentration of a surface of the negative electrode active material particle is set to 10 atm % or more and 20 atm % or less.

2. The production method according to claim 1, wherein the causing of the coating to contain fluorine includes causing the low crystalline carbon and a plasma of carbon tetrafluoride gas to react with each other.

\* \* \* \* \*